United States Patent [19]
Le Marchand

[11] 3,782,251
[45] Jan. 1, 1974

[54] SPRING BRAKE WITH MANUAL RELEASE MECHANISM

[75] Inventor: Claude Le Marchand, Villiers-Le-Bel, France

[73] Assignee: Societe Anonyme D.B.A.

[22] Filed: Feb. 14, 1972

[21] Appl. No.: 226,134

[30] Foreign Application Priority Data
Mar. 2, 1971  France .............................. 7107092

[52] U.S. Cl. .................................... 92/63, 92/130
[51] Int. Cl. ............................................. F01b 7/00
[58] Field of Search ........................................ 92/63

[56] References Cited
UNITED STATES PATENTS
3,107,583  10/1963  Woodward ............................ 92/63
3,136,227   6/1964  Williams ................................. 92/63
3,217,611  11/1965  Leighton ................................. 92/63
3,502,003   3/1970  Dobrikin et al ......................... 92/63

*Primary Examiner*—Paul E. Maslousky
*Attorney*—Ken C. Decker et al.

[57] ABSTRACT

Spring brake actuator having a manual release mechanism. In this actuator, the push-rod is slidably received through an opening in the piston, the piston being connected to the push-rod by a bayonet type locking means in which members can be engaged with one another by rotating the push-rod in one direction. A telescopic connection arranged rearwardly of the piston includes a control member manually operable from the exterior of the actuator housing for rotating the push-rod in the other direction to thereby dissociate the push-rod from the piston and cancel the braking action of the actuator. The push-rod is rotationally urged in the locking direction by a spring for allowing the actuator to be automatically reset when its supply in fluid pressure is restored.

6 Claims, 2 Drawing Figures

SPRING BRAKE WITH MANUAL RELEASE MECHANISM

This invention relates to a spring brake actuator having a manual release mechanism.

Conventional emergency and parking brake system for motor vehicles comprise a spring actuator having a piston movable in a housing, a spring located between the piston and a rear wall of the housing to urge the piston away from the rear wall, an inlet port for introducing a pressurized fluid which drives the piston toward the rear wall against the bias of the spring, and a push-rod connected to the piston and extending axially forwardly to be received through an opening of the housing. When the actuator is not supplied with fluid pressure, the brakes are applied by the force of the spring. The absence of fluid pressure may either be due to the actuation of a valve by an operator when parking the vehicle, or to an accidental fault in the fluid circuits of the braking system.

A manual release mechanism is generally provided for allowing the vehicle to be removed from a dangerous or awkward spot such as a cross- roads or a level crossing when the brake controls are inoperative for example when a conduit is ruptured. Known types of manual release mechanisms use a screw and nut assembly for cancelling the action of the spring either by re-compressing the spring or by displacing the push-rod with respect to the piston. With such an arrangement, the manual release of the brakes necessitates more time than is adequate in a case of emergency. The time required increases as the stroke of the piston is greater, and a nearly equivalent expenditure of time is then required for resetting the spring brake actuator to its original condition.

An object of the invention is to provide a spring actuator with which the manual release of the brakes is obtained very quickly, independently of the length of the piston stroke.

An another object of the invention is to provide a spring actuator which is automatically reset to its normal operating condition once its supply in fluid pressure is restored.

In the spring actuator according to the invention, the push-rod is sealingly and slidably received through an opening in the piston, the piston being connected to the push-rod by way of a locking means comprising a member which is fixed relative to the piston and cooperates with a member carried on the rear end region of the push-rod, said members being engageable with one another by rotating the push-rod in one direction, a telescopic connection arranged between the rear end of the push-rod and the rear wall of the housing including a control member manually operable from the exterior of the housing for rotating the push-rod in the other direction to thereby dissociate the push-rod from the piston and cancel the braking action of the actuator.

The invention will now be described by way of example with reference to the accompanying drawings in which.

Figure 1:
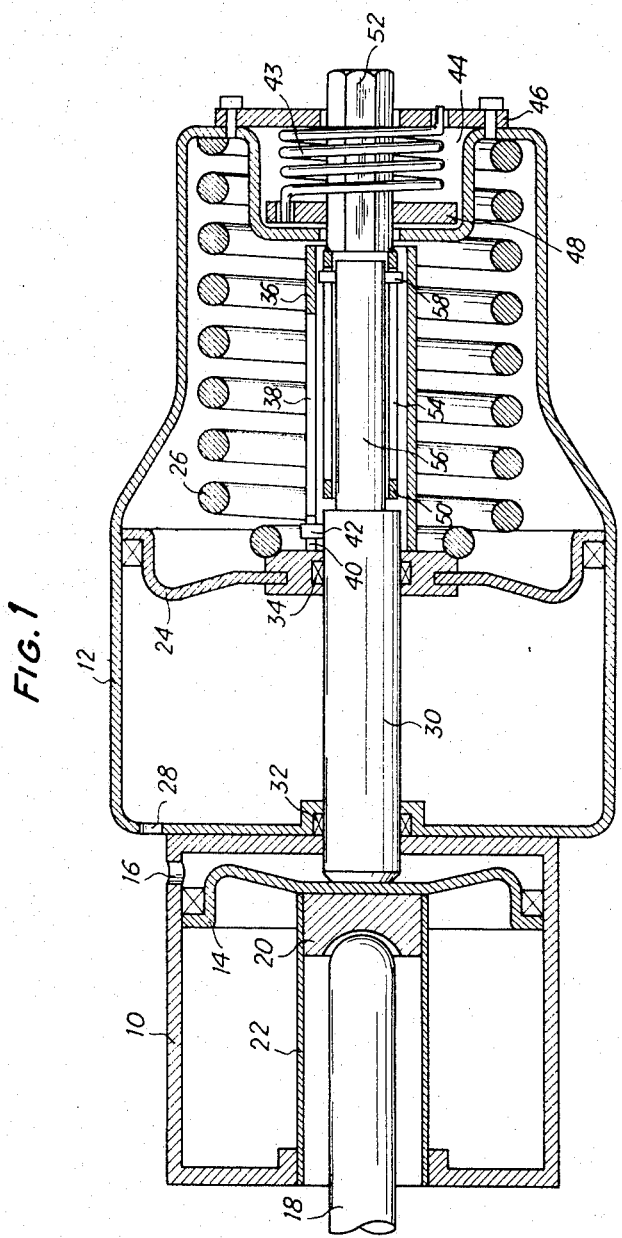
FIG. 1 is simplified cross-sectional view of a combined service and spring brake actuator including a spring brake actuator according to the invention.

Referring now to FIG. 1, numerals 10 and 12 designate broadly the respective housings of a service brake actuator and a spring brake actuator which are combined. Housings 10 and 12 are coaxially arranged in end-to-end relationship. The service actuator housing 10 contains a slidable piston 14 and is adapted to be connected to a conventional brake pedal by way of a port 16. Upon depression of the pedal, service pressure penetrates into the housing to exert a force on the rear surface of piston 14, and the thrust of the piston moves a plunger 20 and a brake rod 18 in a forward direction to apply the brakes in a manner well-known in the art.

The spring brake actuator is useful for applying the brakes in parking and emergency conditions. A piston 24 is slidably mounted in the housing 12 of this actuator, and a spring 26 bears on the rear surface of piston 24. A port 28 is adapted to be connected to an emergency reservoir, so that air-pressure from this reservoir acts on the front face of piston 24, against the force of spring 26, thus maintaining piston 24 in the brake-released position shown in FIG. 1. A push-rod 30 is slidably received through a central passage formed in piston 24, and through a central passage formed in the adjacent walls of housing 10 and 12, each passage being sealed by a resilient sealing ring 32, 34. The front end of push-rod 30 is in engagement with piston 14 in the service actuator housing 10, when both actuators are in the brake-released position shown in FIG. 1.

In the invention, the push-rod 30 is connected with the piston 24 of the spring actuator by a bayonet type locking means in which a tubular sleeve 36 connected to the rear surface of piston 24 comprises one or more longitudinal slots 38, each terminating in a recess 40, whilst the push-rod 30 comprises one or more radial projections 42 which can either slide in the slots 38 or be retained in the recesses 40. The push-rod 30 is connected to a biasing arrangement including a spring 43 which develops a force urging push-rod 30 to rotate in the direction in which the projections 42 penetrate into the recesses 40. In the biasing arrangement, the spring 43 is located in a cavity 44 at the rear end of the housing 12, the spring being biased in rotation with one end connected to a cover member 46 and the other end connected to a plate 48. The plate 48 is carried by an axially extending socket comprising a hollow cylindrical portion 50 and a solid portion 52 which is hexagonal in cross-section and forms a control member. The hollow cylindrical portion 50 is located within the housing 12 and has one or more longitudinal slots 54, while the solid portion 52 passes loosely through openings formed in the housing 12 and in the cover member 46, a short length of this portion extending from the cover member. The push-rod 30 comprises a rearward extension 56 which is received in the hollow portion 50 of the socket, the end region of extension 56 carrying radially extending lugs 58 which are received in the slots 54.

In the operation, when the brake system is in good operating condition, the air-pressure from the emergency reservoir is communicated to the spring actuator 12 and acts on the piston 24 to produce a thrust which is sufficient for maintaining the spring 26 under compression. The piston occupies the brake-released position shown in FIG. 1 and, in this position, the push-rod 30 is rigidly connected to the piston 24, since the projections 42 of the push-rod are engaged in the recesses 40 of the sleeve 36 which extends from the rear surface of the piston.

If the pressure in the spring actuator decreases to a level insufficient for overcoming the force of spring 26, the piston 24 and the push-rod 30 will move forwardly, thus exerting a thrust on piston 14 and rod 18 of the service actuator in the brake applying direction. While the push-rod is moving, the lugs 58 carried by the extension 56 of this push-rod will move along the slots 54 formed in the hollow portion 50 of the socket.

The brakes can be released manually in case of necessity, if sufficient air-pressure cannot be restored in the spring brake actuator. Manual release is readily obtained by placing a wrench on the hexagonal portion 52 of the socket, and rotating the socket in the direction in which the projections 42 will move out of the recesses 40 to be engaged in the slots 38. Since projections 42 are slidable in slots 38 and lugs 58 slidable in slots 52, the push-rod 30 will be free to move axially with respect to the piston 24. Consequently, the return mechanism of the brake system will move the push-rod 30 rearwardly and the brakes will be released.

The spring actuator is automatically reset to its normal operating state when air-pressure is restored in the emergency reservoir. It can be seen that the pressure drives the piston 24 rearwardly and, when recesses 40 are facing projections 48, the spring 43 causes the push-rod 30 to rotate so as to insert the projections back again into the recesses.

It will be understood that the solid portion 52 of the socket has not necessarily a hexagonal cross-section and can have any shape adapted to receive a tool for applying a twisting strain. Also, the connection between the socket 50-52 and the rearward extension 56 of the push-rod 30 can be a telescopic connection of any known type allowing one member to be fixed in rotation while axially movable with respect to another. This could be obtained for example with a socket having internal splines or a hexagonal bore, the extension of the push-rod having a corresponding shape. In such a connexion, the position of the cooperating members can even be inverted.

Figure 2:
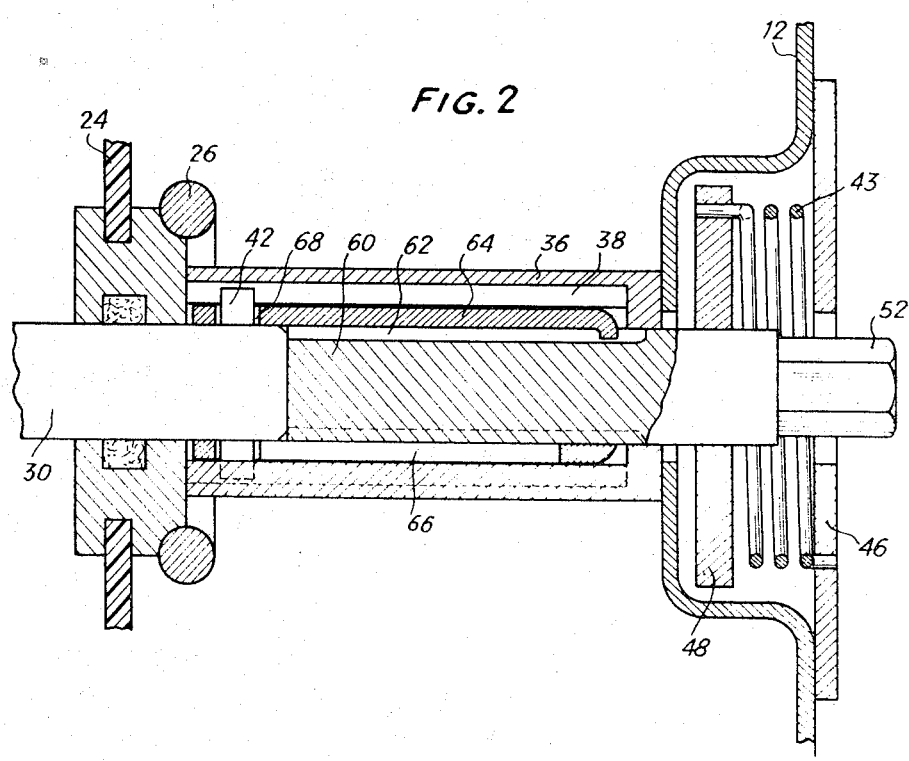
FIG. 2 is a fragmentary view of a spring actuator illustrating another embodiment of the invention.

In the embodiment shown in FIG. 2, the socket is constituted by a solid shaft 60 having one or more longitudinal ridges 62, and the rotation of the tool receiving portion 52 is transmitted to a sheath 64 which is guided by the ridges 62 and has slots 66 giving passage to the projections 42 formed on the push-rod 30. The projections 42 are received in recesses 68 formed in the end region of the slots 66. The sheath 64 is encaged in the sleeve 36 which extends from the rear of the piston 24. The operation of this embodiment differs only in that, instead of being directly transmitted, rotation of the tool receiving portion 52 is transmitted to the push-rod 30 through the sheath 64, and the projections 42 are received in recesses which are formed in the sheath instead of being received in the sleeve 36.

What is claimed is:

1. A spring brake actuator having a piston movable in a housing, a spring located between the piston and a rear wall of the housing to urge the piston away from the rear wall in a brake applying direction, an inlet port for introducing into the housing a pressurized fluid to drive the piston toward the rear wall against the bias of the spring, and a push-rod connected to the piston and extending axially forwardly to be sealingly and slidably received through an opening in the housing, wherein the push-rod is sealingly and slidably received through an opening in the piston, the piston being rigidly connected to the push-rod by way of a locking means comprising a member which is fixed relative to the piston and cooperates with a member carried on the rear end region of the push-rod, said members being engageable with one another by rotating the push-rod in one direction, a telescopic connection arranged between the rear end of the push-rod and the rear wall of the housing including a control member manually operable from the exterior of the housing for rotating the push-rod in the other direction to thereby dissociate the push-rod from the piston and cancel the braking action of the actuator.

2. A spring actuator according to claim 1, wherein the locking means comprises at least one recess formed in said member fixed relative to the piston, said recess cooperating with a projection formed radially on the push-rod.

3. A spring actuator according to claim 2, wherein the telescopic connection comprises an axial extension formed on the push-rod rearwardly of the piston and received in a hollow cylindrical member extending from said control member, said extension carrying at least one radially extending lug received in a slot formed in the cylindrical member.

4. A spring actuator according to claim 3, wherein said member fixed relative to the piston includes an axially extending tubular sleeve having at least one longitudinal slot connected to the rear surface of the piston, said slot receiving said projection, said recess being formed laterally in the end of said slot which is directed toward the piston.

5. A spring actuator according to claim 2, wherein said member fixed relative to the piston includes an axially extending tubular sleeve, the telescopic connection comprises a tubular sheath engaged in said axially extending sleeve, said sheath receiving the end portion of the push-rod and a shaft which extends from the control member, said sheath being axially movable but fixed in rotation with respect to said shaft and including at least one slot to receive said projection, said recess being formed in the end of said slot which is directed toward the piston.

6. A spring actuator according to claim 1,
wherein a spring having ends connected to the control member and to an element fixed with respect to the housing respectively is biased in rotation to urge the control member and the push-rod controlled thereby in said one direction, whereby the push-rod is automatically locked on the piston when the members of the locking means are facing each other.

* * * * *